United States Patent [19]
Nakano et al.

[11] Patent Number: 5,098,813
[45] Date of Patent: Mar. 24, 1992

[54] PROCESSES FOR PREPARING STIMULABLE-PHOSPHOR RADIATION IMAGE STORAGE PANEL USING SPECIFIED HEAT OR HEAT AND ACTIVATOR-CONTAINING GAS TREATMENT

[75] Inventors: Kuniaki Nakano; Naoko Nakamaru; Satoshi Honda; Hisanori Tsuchino; Fumio Shimada, all of Hino, Japan

[73] Assignee: Konica Corporation, Tokyo, Japan

[21] Appl. No.: 560,240

[22] Filed: Jul. 23, 1990

Related U.S. Application Data

[63] Continuation of Ser. No. 215,870, Jul. 6, 1988, abandoned.

[30] Foreign Application Priority Data

Jul. 13, 1987 [JP]  Japan .................. 62-175381
Jul. 13, 1987 [JP]  Japan .................. 62-175382

[51] Int. Cl.$^5$ .................. G03C 1/00; G03B 42/00
[52] U.S. Cl. .................. 430/139; 430/495; 250/484.1; 252/301.4 R; 252/301.4 H; 427/157
[58] Field of Search .......... 430/139, 495; 428/690, 428/691; 250/484.1; 252/301.4 R, 301.4 H; 427/157

[56] References Cited

U.S. PATENT DOCUMENTS

| | | | |
|---|---|---|---|
| 3,894,164 | 7/1975 | Dismukes et al. | 427/157 |
| 4,039,699 | 8/1977 | Morimoto et al. | 427/38 |
| 4,076,891 | 2/1978 | Joiner, Jr. | 428/691 |
| 4,707,419 | 11/1987 | Ogura et al. | 428/690 |
| 4,835,398 | 5/1989 | Nakamura | 250/484.1 |

FOREIGN PATENT DOCUMENTS 175578  3/1986  European Pat. Off. .
2613824  10/1977  Fed. Rep. of Germany ...... 430/139

Primary Examiner—Marion E. McCamish
Assistant Examiner—Christopher D. RoDee
Attorney, Agent, or Firm—Frishauf, Holtz, Goodman & Woodward

[57] ABSTRACT

Disclosed is a process for preparing a radiation image storage panel having a phosphor layer containing an activated stimulable phosphor, characterized in that applying a heat treatment that can secure the content of an activator in the activated stimulable phosphor.

Disclosed is also a process for preparing a radiation image storage panel having a layer of a stimulable phosphor layer activated with an activator, wherein a stimulable phosphor matrix layer is formed, and thereafter the activator is diffusion added to the layer to form a stimulable phosphor layer.

9 Claims, 7 Drawing Sheets

FIG. 4
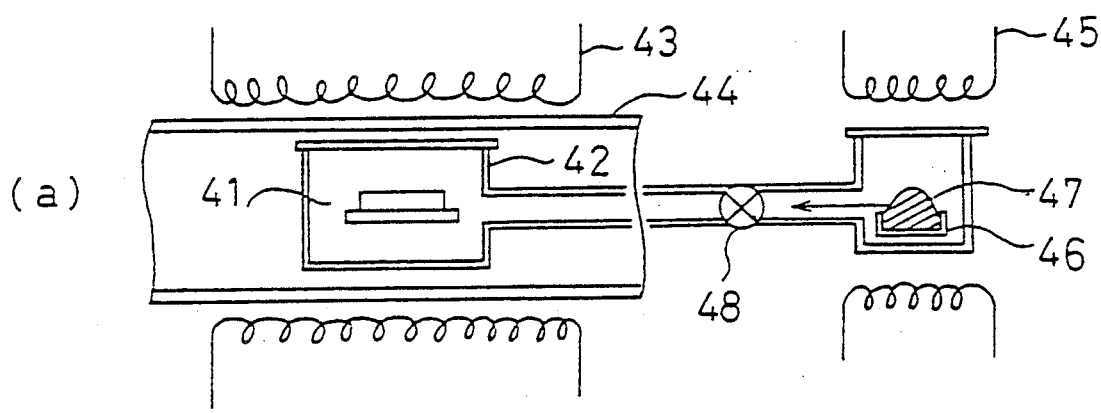
(a)
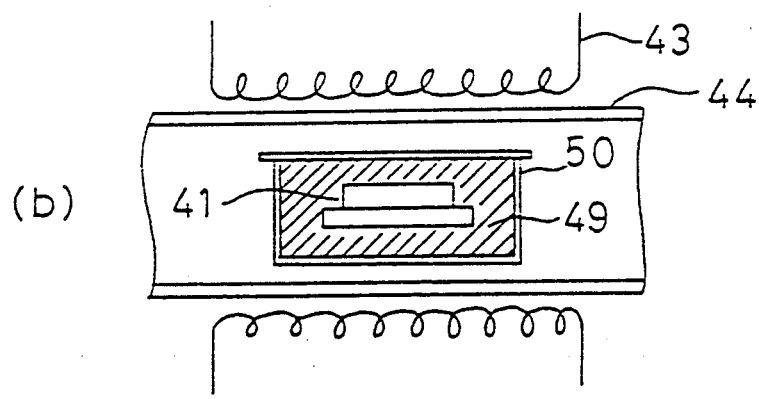
(b)

PROCESSES FOR PREPARING STIMULABLE-PHOSPHOR RADIATION IMAGE STORAGE PANEL USING SPECIFIED HEAT OR HEAT AND ACTIVATOR-CONTAINING GAS TREATMENT

This is a continuation of application Ser. No. 07/215,870, filed July 6, 1988 now abandoned.

BACKGROUND OF THE INVENTION

This invention relates to a process for preparing a radiation image storage panel employing a stimulable phosphor.

Radiation images like X-ray images are often used in diagnosis of diseases. The methods have traditionally employed light-sensitive silver halide materials and a fluorescent screen to visualize images. However, recently, methods directly taking out images from phosphors are being used.

The recent methods include, for example, a method in which the radiation transmitted through a subject is absorbed by a phosphor, and thereafter this phosphor is excited by light or heat energy to cause the radiation energy accumulated by being absorbed to radiate as fluorescence. The fluorescence is then detected and formed into an image.

Specifically, U.S. Pat. No. 3,859,527 and Japanese Unexamined Patent Publication No. 12144/1980 disclose radiation image storage methods in which a stimulable phosphor is used and visible light or infrared rays are used as stimulating light.

This method employs a radiation image storage panel (hereinafter often referred to as "panel") comprising a support, and formed thereon, a stimulable phosphor layer (hereinafter often referred to simply as "phosphor layer"). Radiation transmitted through a subject fails on the phosphor layer to accumulate radiation energy corresponding to the radiation transmission degree of each areas of the subject, thereby to form an image. Thereafter the phosphor layer is scanned with the stimulating light to cause the radiation energy accumulated in the areas to radiate and convert into light, thus obtaining an image formed of signals based on the strength of the light.

The image finally obtained may be reproduced as a hard copy, or may be reproduced on a CRT.

The panel having the phosphor layer used in this radiation image storage method is required to have low graininess of the image and yet have high sharpness, in addition to high radiation absorption and light conversion (including both, herein called "radiation sensitivity"). The radiation sensitivity is experimentally measured by using emission intensity.

However, in general, the panels having the phosphor layer are prepared by coating on a support a dispersion containing a particulate stimulable phosphor having a particle diameter of about 1 to 30 μm and an organic binder, followed by drying. The result is in a low charge density for the stimulable phosphor (charge weight: 50%), requiring that the phosphor layer be applied thickly to achieve sufficiently high radiation sensitivity dielectric constant.

However, the sharpness of the image in the above radiation image storage method has a tendency to be greater with a decrease in the layer thickness of the phosphor layer of a panel, so that the phosphor layer must be made thinner to improve the sharpness.

Also, the graininess of the image in the above radiation image storage method depends on the spatial fluctuation of radiation quantum number (i.e. quantum mottles) or the structural disorder of the phosphor layer of a panel (i.e. structure mottles), so that making the layer smaller thickness of the phosphor layer brings about decrease in the radiation quantum number to be absorbed in the phosphor layer. This, in turn, causes an increase in the quantum mottles, or brings the structural disorder to be realized to cause a lowering of image quality Thus, the phosphor layer must be made with a large thickness to reduce the graininess of images.

In other words, in the conventional panels, the sensitivity to radiation and the graininess of images show quite opposite tendencies to the sharpness of images with respect to the layer thickness of the phosphor layer Accordingly, the above panels have been prepared with a compromise between the sensitivity to radiation, the grainines and the sharpness to a certain extent.

Incidentally, as well known the sharpness of images in the conventional radiography depends on the extent of the instantaneous emission (emission at the time of irradiation of radiations) of the phosphor present in a fluorescent screen. In contrast therewith, however, the sharpness of images in the radiation image storage method utilizing the above-mentioned stimulable phosphor does not depend on the extent of stimulated emission of the stimulable phosphor present in the panel, but depends on the stimulating light in said panel.

Therefore, if the stimulated emission by the stimulating excitation light irradiated at a certain time (ti) is comprised only of the emission from picture elements (xi, yi) on said panel on which the stimulating light had been actually irradiated at the time (ti), the emission, whatever extent it has, does not affect the sharpness of the resulting image.

From such a viewpoint, there have been devised some methods for improving the sharpness of radiation images They are exemplified by a method in which a white powder is mixed into the phosphor layer of a panel as described in Japanese Unexamined Patent Publication No. 146447/1980, and a method in which a panel is so colored that the average reflectance at the stimulating excitation wavelength region of a stimulable phosphor is smaller than the average reflectance at the stimulated emission wavelength region of said stimulable phosphor. These methods, however, necessarily result in an extreme lowering of the sensitivity if the sharpness is improved, and can not be said to be preferable methods.

In view of the disadvantages and the conflict between properties as stated above, Japanese Unexamined Patent Publication No. 73100/1986 proposes a panel comprising a phosphor layer, and a preparation process thereof, free of any binder, formed by a vapor phase build-up method such as vacuum deposition. According thereto, the phosphor layer of the above panel contains no binder, so that the charge weight in the phosphor layer can be remarkably improved and also the directivity of the stimulating excitation light and stimulated emission of the phosphor layer can be improved, resulting in improvement in the sensitivity to radiation of the panel and the graininess of images, and at the same time improvement in the sharpness of images.

The panel containing no binder can be prepared by the vapor phase build-up methods such as sputtering, CVD and vapor deposition, but, when taking account of the production cost, the vapor deposition can be said to be the most preferable method.

However, when vacuum deposition methods or the like are used, a problem arises due to the differing vapor pressure of components when heated in the crucible, for deposition. The result is that the composition of the deposited stimulable phosphor is different from the composition charged into the crucible. The usual result is that the panel has lower sensitivity to radiation.

In other words, although the method for the vapor phase build-up of the stimulable phosphor may bring about a number of advantages as stated above, neglecting the conditions for vaporizing the phosphor when the stimulable phosphor is formed or a heat treatment is effected may result in unexpected difficulties.

For example, researches made by the present inventors in regard to Tl-activated stimulable RbBr:Tl phosphors revealed that the instantaneous emission intensity is constant when Tl content is in the range of from $10^{-2}$ to $10^0$ mol %, and it is therefore unnecessary to be greatly careful of its compositional ratio as a generally available phosphor so long as the Tl content is kept within a constant range (FIG. 8).

However, the stimulated emission important to the panel has a peak near $3 \times 10^{-2}$ mol % with its intensity greatly lowering in the vicinity thereof.

Accordingly, the difference in the vapor pressure between an activator and a stimulable phosphor matrix in carrying out vapor phase build-up of the stimulable phosphor by vapor deposition or the like may result in the activator being deposited on the panel support precedently or retardatorily to the phosphor matrix. If thereby the concentration of the activator comes to differ in the thickness direction in the phosphor layer or the activator is not added, resulting in deviation from its optimum concentration, it may follow that the phosphor layer is retarded rather than enhanced with respect to the desired activity expected by the use of the activator or that it exhibits no sufficient emission characteristics.

In preparing the above panel utilizing the stimulated emission, also particularly important for obtaining a panel having high sensitivity is to precisely control the concentration of the activator in a post-treatment (heat treatment).

In this connection, RbBr exhibits a vapor pressure of 1 mmHg at 777° C., and TlBr, 10 mmHg at 522° C., thus having a great difference in the vapor pressure There has been little reported in this regard, and examples frequently seen are activated stimulable phosphors having poor performances in spite of the activator densities that are optimum as a whole.

SUMMARY OF THE INVENTION

This invention relates to a process for preparing a radiation image storage panel by the vapor phase build-up method proposed in the above employing the stimulable phosphor, and intends to further improve the process. An object of this invention is to provide a process for preparing a radiation image storage panel that can form a stimulable phosphor layer having the desired composition.

Another object of this invention is to provide a process for preparing a radiation image storage panel that can sufficiently exhibit the advantages inherent in the vapor phase build-up method to have a good graininess and sharpness and also can have a high sensitivity of radiation images.

The above objects of this invention can be achieved by a process for preparing a panel having a phosphor layer containing an activated stimulable phosphor, wherein a heat treatment is used to secure the content of an activator in said activated stimulable phosphor.

The above objects can be also achieved by a process for preparing a radiation image storage panel having a layer of a stimulable phosphor layer activated with an activator, wherein a stimulable phosphor matrix layer is formed, and thereafter the activator is diffusion added to said layer to form a stimulable phosphor layer.

BRIEF DESCRIPTION OF THE DRAWINGS

FIG. 4(a and b) illustrates a diffusion method addition apparatus used in this invention;

DESCRIPTION OF THE PREFERRED EMBODIMENTS

This invention will be described below in detail.

Figure 9:
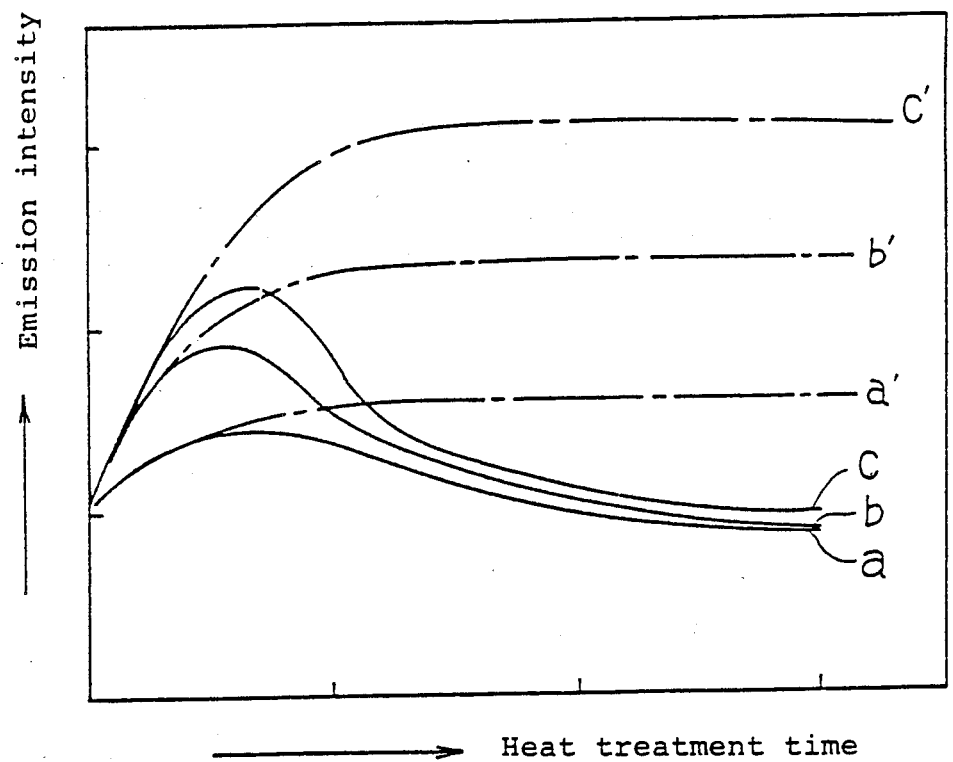
FIG. 9 is a graph showing changes in sensitivity with respect to heat treatment time.

Applying the previously mentioned heat treatment (heat-sensitizing treatment) to the phosphor layer comprised of a stimulable phosphor results in exhibition of characteristic form in its heat-sensitization curve. FIG. 9 shows the heat-sensitization curves at the respective temperatures for the heat treatment. In the figure, curves a, b and c indicate the heat-sensitization curves of a phosphor layer comprised of RbBr:Tl at 200, 400 and 600° C.

The heat-sensitization curve shows an abrupt rise in the sensitization rate and sensitivity level, but has a saturation point, showing monotonous desensitization thereafter.

This tendency remarkably appears when the vapor pressure of the activator is substantially equal or the vapor pressure of the activator is larger, although the above desensitization following the saturation point is small if the vapor pressure of the activator contained in the phosphor matrix is smaller than that of the stimulable phosphor matrix in the stimulable phosphor.

More specifically, it is presumed that the sensitivity factors of phosphor crystals are adjusted favorably to the increase in the sensitivity, but there occurs escaping of the phosphor from the phosphor matrix, both of which compete with each other at the saturation point, and thereafter the desensitizing effect owing to the escaping of the activator surpasses the other, bringing about the appearance of the desensitization.

From this standpoint, the heat-sensitizing treatment temperature was set to 200, 400 and 600° C. and the heat-sensitizing treatment was carried out while the atmosphere surrounding the phosphor was so controlled that the composition of the RbBr:Tl stimulable phosphor in the phosphor layer may not be changed. As a result, although the sensitization tends to saturate as shown by curves a', b' and c', no desensitization phenomenon appears.

This invention has been accomplished on the basis of the above finding.

Accordingly, an embodiment of this invention is characterized by amortizing the escape loss of the activator during and/or after heat-sensitizing treatment, where the atmosphere of the phosphor layer in the heat-sensitizing treatment may be adjusted on the basis of the vapor pressure of the activator, or there may be taken a diffusion method in which a film containing an activator separately prepared is brought into close contact with the phosphor layer to allow the activator to penetrate into the phosphor layer, or, alternatively, an ion implantation method.

This invention is also characterized in that a stimulable phosphor matrix layer (hereinafter "phosphor matrix layer") containing no activator is formed on a support or a protective layer, and thereafter the activator is diffused into said layer to change it into a phosphor layer.

This invention is also characterized in that the heat-sensitizing treatment can be applied at the same time with the diffusion-addition of the above activator. This heat-sensitizing treatment promotes the growth of stimulable phosphor crystals and a decrease in the crystal defects, and improves the sensitivity to X-rays.

Various methods are available as methods for adding the activator, but one of the most preferable methods is the addition by a thermal diffusion method.

The preparation process of this invention brings about particularly remarkable effect when the stimulable phosphor matrix comprises an alkali halide. This is because the phosphor matrix layer formed by vapor phase build-up of an alkali halide tends to assume a column-like crystal structure, so that the activator can be readily diffused into the matrix along the boundaries of the column-like crystal structure, from the surface of the phosphor matrix layer toward the support side.

As a result, the concentration of the activator becomes uniform in the thickness direction of the phosphor matrix layer, and the activator concentration also becomes uniform over the whole panel, thus making it possible to readily prepare a panel having less sensitivity irregularity and having high sensitivity.

In this invention, the difference in the vapor pressure between the stimulable phosphor matrix and the activator may preferably be rather greater, and yet the vapor pressure of the activator may preferably be greater than the former. This is because when the thermal diffusion of the activator is effected, the vapor of the activator may rapidly diffuse along the column-like crystals even at a relatively low temperature, so that the addition of the activator to the phosphor matrix layer can be completed at a lower temperature and in a shorter time.

Incidentally, as described above, this invention is for one thing largely characterized in that the diffusion-addition of the activator and the heat-sensitizing treatment can be carried out simultaneously, and therefore the thermal diffusion temperature of the activator is determined also by taking account of the heat-sensitizing effect of the phosphor layer.

The preparation process of this invention will be described below in greater detail.

A first process may include a process comprising separately providing a phosphor matrix layer and an activator layer on a support by a vapor phase build-up method, thereafter applying heat treatment to bring the activator into the phosphor matrix layer by thermal diffusion to form a phosphor layer.

The vapor phase build-up method that may be used without any difficulty includes any of vacuum deposition, sputtering, CVD and the like.

Figure 3:
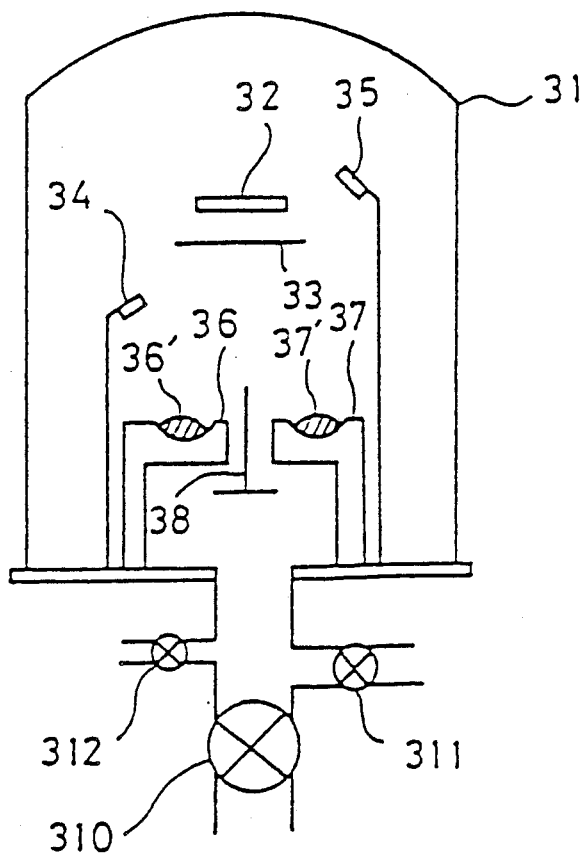
FIG. 3 illustrates an example of a vapor deposition apparatus used in this invention.

As an example of the vapor phase build-up method, FIG. 3 schematically illustrates a vapor deposition apparatus used in a resistance heating method which is one of vacuum deposition methods.

In FIG. 3, the numeral 31 denotes a bell jar (a vacuum room); 32, a support for forming thereon the phosphor layer; 33, a shutter for controlling vapor deposition film thickness; 34 and 35, film thickness detectors for controlling the vapor deposition rate on the support; 36 and 37, resistance heaters (such as crucibles and boats); and 36' and 37', evaporation sources (36': an activator; 37' a stimulable phosphor matrix). The numeral 38 denotes a masking shield which is so provided that the evaporation sources may not be mixed with each other at the time of the vapor deposition, and is provided in the manner as shown in the figure if necessary. The numeral 310 denotes a main valve; 311, an auxiliary valve; 312, a leak valve interlocking with an evacuation system (not shown) and used for producing a given vacuum state in the bell jar 31, and for maintaining and regulating the same.

In using the above vapor deposition apparatus in this invention, the activator and the stimulable phosphor matrix which are the evaporation sources are charged in the resistance heaters 36 and 37, respectively Here, preferred is to carried out degasing.

Next, the support 32 is so disposed as to face the evaporation sources. The spacing therebetween is set to about 10 to 40 cm in conformity with an average flying distance of the evaporation sources. Then the main valve 310 the like is operated to evacuate the gas inside the bell jar 31 to give a vacuum degree of about $10^{-4}$ to $10^{-6}$ Torr. Subsequently the evaporation source 36' is first evaporated by heating by use of the resistance heater and the shutter 33 is opened to initiate the vapor deposition. The vapor deposition is proceeded while controlling the deposition rate and deposition thickness by the film thickness detector 34 before the film comes to have a given thickness, whereafter the shutter is closed to stop the deposition.

Next, the evaporation source 37' is evaporated by heating to similarly carry out the vapor deposition by using the film thickness detector 35.

The deposition rate in this invention may differ depending on the types of the stimulable phosphor raw materials to be used and the intended characteristics of a deposited film, but it ranges from $10^2$ to $10^7$ angstroms/min.

Figure 2:
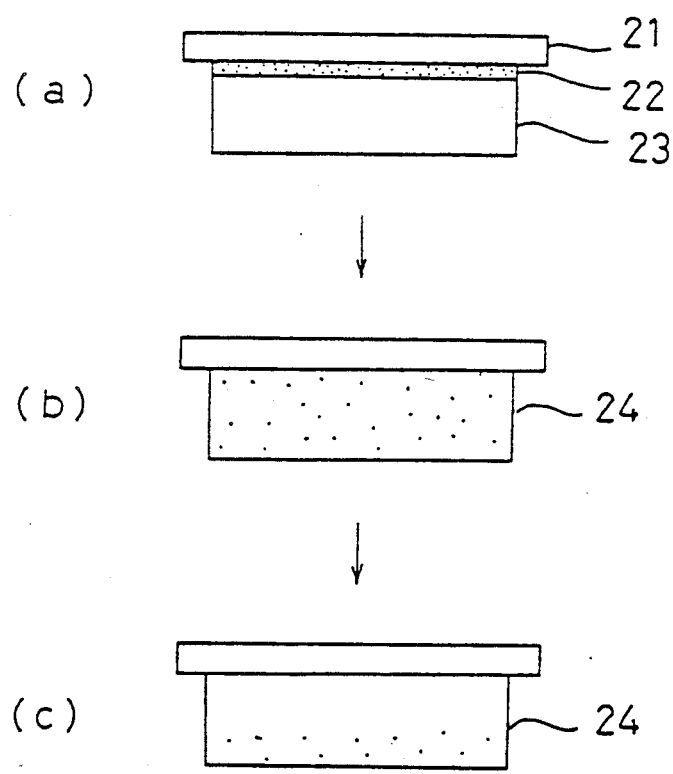
FIG. 2(a, b and c) is a view explanatory of the phenomenon shown by (a) in FIG. 1, from the view point of panels.

An example of constitution of the vapor phase built-up layer thus formed (a phosphor matrix layer + an activator layer) are illustrated in FIG. 2(a). In this figure, 21 denotes a support, 22, an activator layer, 23, a phosphor matrix layer.

Figure 1:
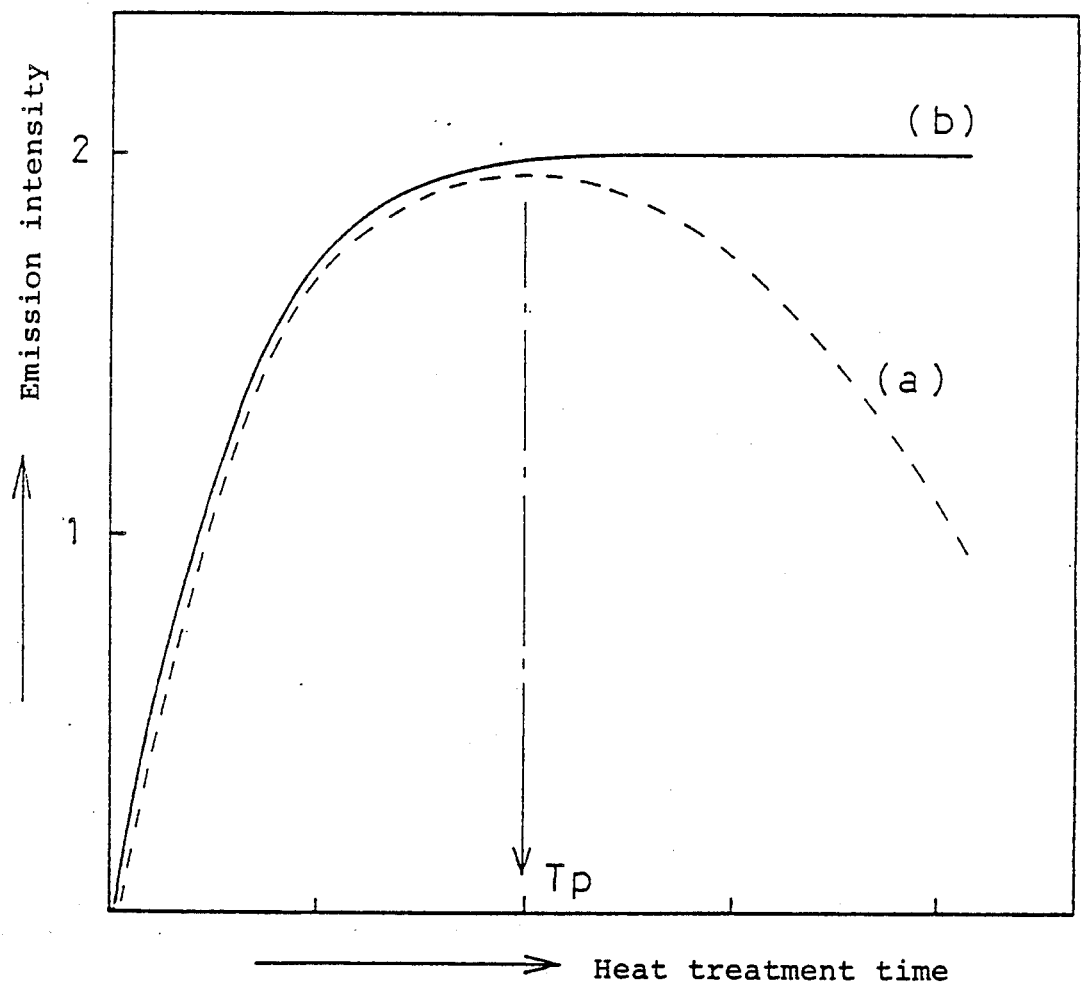
FIG. 1 is a graph showing a change in emission intensity with respect to heat treatment time.
Figure 7:
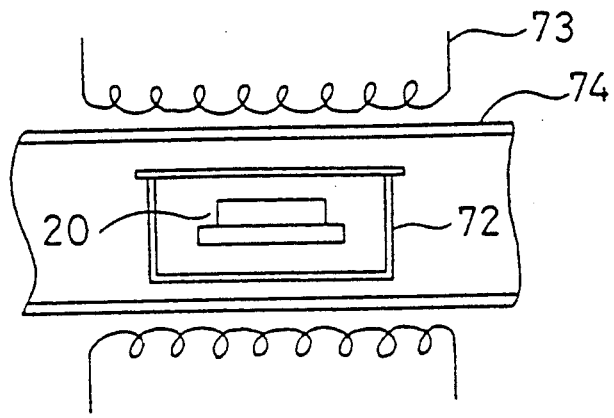
FIG. 7 is a schematic illustration of a heat-treating electric furnace used in this invention.
Figure 8:
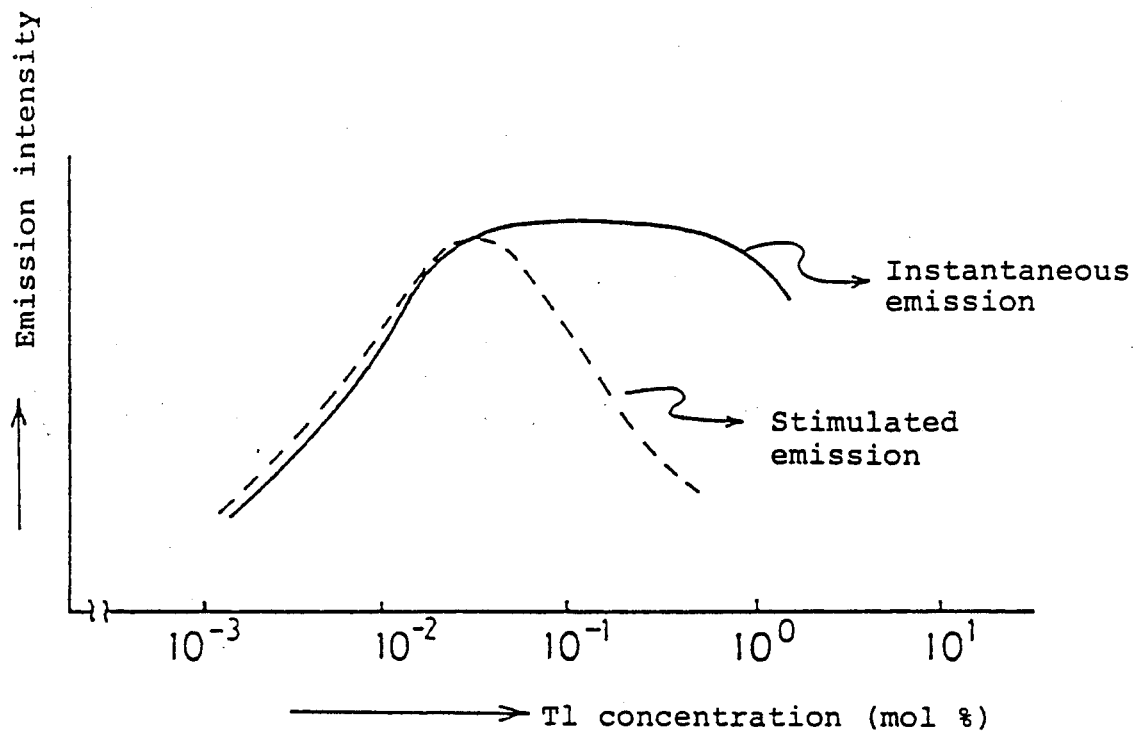
FIG. 8 is a graph showing the relationship between the emission intensity of a RbBr:Tl stimulable phosphor and the Tl content.

This panel is applied with heat treatment at a suitable temperature with use of a heat-treating electric furnace as illustrated in FIG. 7, then the activator uniformly diffuses into the phosphor matrix layer 23 as illustrated in FIG. 2(b) to form a phosphor layer 24, and the sensitivity increases with lapse of heat-treating time as shown by (a) in FIG. 1. As a result, there can be obtained a panel having a high sensitivity as compared with the panel to which the activator was simultaneously added at the time of the vapor deposition However, the heat-treating time otherwise made overly long may result in a gradual lowering of the sensitivity. This is because, as illustrated in FIG. 2(c), the activator diffusion-added in the phosphor matrix layer escapes from inside the matrix, and it is necessary for preventing this to set a eat-treating time Tp at which the sensitivity becomes maximum. Incidentally, in FIG. 7, 20 denotes a panel to be treated by diffusion, 72, a heat-treating vessel, 73, a heating means, 74, a heat-treating furnace.

In the above process, the phosphor matrix layer 23 and the activator layer 22 may not necessarily be provided in this order, and they may be provided reversely or may have a multi-layer structure.

The temperature T for heat-treating the panel may vary depending on the type of the stimulable phosphor, but it may preferably be lower than the melting point Tm of the stimulable phosphor matrix, and in the range of $\frac{1}{4}Tm < T < Tm$.

A second process include a process comprising forming a phosphor matrix layer on a support by a vapor phase build-up method, and then adding an activator separately prepared to said phosphor matrix layer to make up a phosphor layer, and this addition method includes a diffusion method and an ion implantation method.

The diffusion method is a method in which, first using the vapor deposition apparatus as illustrated in FIG. 3, a phosphor matrix layer or a phosphor layer having a desired layer thickness is formed on a support, and next an activator addition treatment or sensitization is applied using a diffusion method apparatus as illustrated in FIG. 4(a) or 4(b) to form a phosphor layer. According to this process, a panel having high sensitivity as shown by (b) in FIG. 1 can be prepared by setting appropriate heat-treating temperature and time, or activator concentration It is also possible according to this process, as being free of any lowering of the sensitivity owing to excess of the heat-treating time, to prepare the panel with greater ease than the above-described process.

FIG. 4(a) schematically illustrates the diffusion method apparatus. In the figure, the numeral 41 denotes a panel to which the diffusion-addition or sensitization is applied; and 47, an activator or a material powder containing an activator.

It, for example, comprises a RbBr:TlBr phosphor, a RbBr/Tl mixed powder or a TlBr powder in the instances of the stimulable phosphor matrix comprising RbBr or the phosphor comprising RbBr:Tl.

The numeral 42 denotes a heat-treating vessel for the panel 41 to which the above sensitization is applied; 46, an evaporation vessel for the material powder containing the activator; 43 and 45 each, a heating means; and 48, a gas amount regulating valve, 44, a heat-treating furnace.

The heat-treating vessel 42 and the evaporation vessel 46 are connected to each other through the gas amount regulating valve 48.

First, the panel 41 to be applied with the addition or sensitization is set in the heat-treating vessel 42, and an activator or a material powder containing an activator 47, in the evaporation vessel 46, respectively. Thereafter, the respective vessels are heated to given temperatures by the heating means 43 and 45, and then the gas amount regulating valve 48 is gradually opened to bring the activator gas to diffuse into the heat-treating vessel. Here, the diffusion amount for the activator depends on the heating temperature of the evaporation vessel 46, the temperature difference between the heat-treating vessel 42 and evaporation vessel 46, and the amount for opening and closing the gas amount regulating valve 48.

The heat-treating temperature T for the panel 41 may vary depending also on the type of the stimulable phosphor, but may preferably be lower than the melting point Tm of the stimulable phosphor matrix. It may more preferably be in the range of $\frac{1}{4}Tm < T < Tm$.

After the heat treatment, the above panel 41 is cooled at a given rate to room temperature, thus completing the panel according to this invention.

According to this apparatus, the diffusion-addition of the activator to the phosphor matrix layer, or the heat sensitization to the phosphor crystals and the securing of the activator, and further the annealing to the disturbance of crystals at the time of vapor deposition, are performed simultaneously.

FIG. 4(b) schematically illustrates another example of the diffusion method apparatus. In the figure, the numeral 41 denotes a panel to which the diffusion-addition or sensitization is applied; and 49, a material powder (atmospheric powder) containing an activator. The numeral 50 denotes a heat-treating vessel for the above panel 41.

This apparatus is characterized by bringing the panel 41 and the material powder (atmospheric powder) 49 to coexist in the heat-treating vessel 50.

Employment of such an atmospheric powder enables simple control and amortization of the activator concentration in the panel.

The activator concentration in the atmospheric powder may vary depending on the heating conditions, but may preferably be substantially equal to or larger than the activator concentration of the stimulable phosphor in the panel. The heat-treating temperature T for the panel 21 may preferably have the melting point Tm of the stimulable phosphor matrix like the above-described. It may more preferably be in the range of $\frac{1}{4}Tm < T < Tm$.

The ion implantation method is a method in which a phosphor matrix layer having a desired layer thickness is formed on a support in the same manner as described above, and then an ion implantation apparatus is introduced to effect implantation of activator ions, thus forming a phosphor layer.

Figure 5:
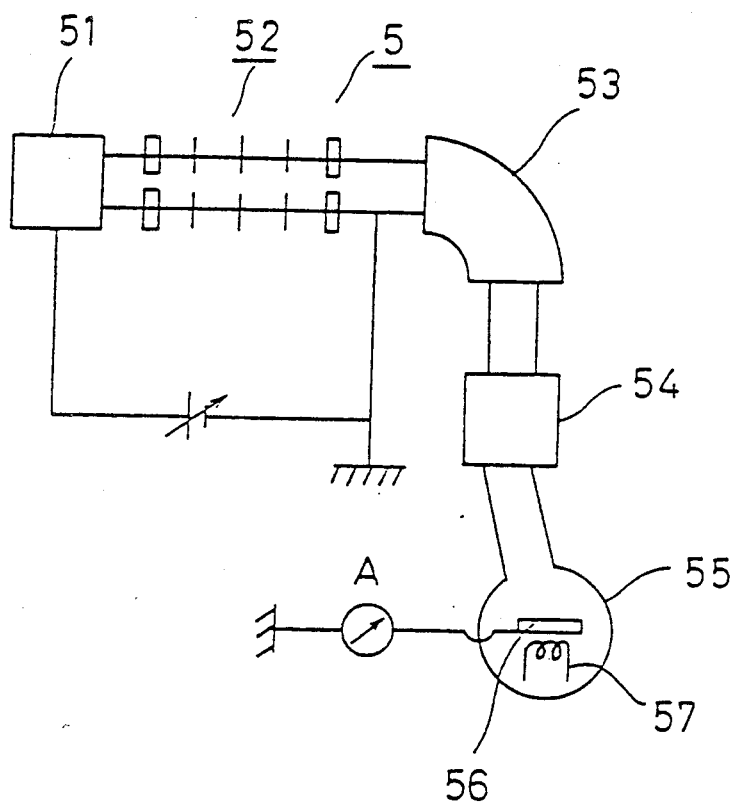
FIG. 5 is a schematic illustration of an example of an ion implantation apparatus.

An example for constituting the ion implantation apparatus 5 is illustrated in FIG. 5.

a) At an ion source section 51, required ions of the activator are formed from gases of its solid, halide, hydride or the like;

b) the ions thus formed are drawn out by a draw-out electrode provided in a draw-out and accelerating lens section 52 and accelerated by selecting energy according to the setting of the average projection flying distance or the activator distribution at an acceleration section;

c) irons having the required energy and mass are taken out at a mass spectrometric analysing section 53;

d) further, ion beams are uniformly swept in the x−y direction at a deflecting section 54; and e) uniformly irradiated on a panel 56 fitted in a sample chamber 55, to which the diffusion-addition is to be applied or which has been subjected to a heat treatment (annealing) by a heating means 57. Here, in order to prevent the tunneling of ions called as the channeling, it is important for the surface of said panel to be made inclined about 7 to 8 degrees to the beam direction. The implantation apparatus has a vacuum degree such that in general the ion source section is evacuated up to about $1 \times 10^{-6}$ Torr, and the sample section, up to $10^{-7}$ Torr.

This method is also preferred as it can precisely control the amount for the addition of the activator, and a panel having a further higher sensitivity can be obtained by applying a heat treatment in the course of, or after, the ion implantation.

In this invention, the phosphor matrix layer serving as an object for the above diffusion-addition treatment of the activator, or the phosphor layer serving as an object for the heat-sensitizing treatment containing the above means for securing the activator, is a phosphor matrix layer or a phosphor layer formed by commonly known vapor phase build-up methods.

More specifically, the phosphor matrix layer may be comprised of a densely built up non-crystalline (amorphous) stimulable phosphor matrix or may take the form such that fine column-like crystals are longitudinally tied in the layer thickness direction to form a layer. in the shape of scallops. Alternatively, large and small network-like crevasses may be provided on the surfaces of the layers formed by the tying in the shape of scallops mentioned above. It may further comprise a phosphor matrix layer having a shape in which the fine column-like crystals are surrounded with gaps on their respective peripheries to have swarmed in the form of frost columns The above crevasses or the gaps may also disappear in the upper or lower direction of the layer thickness direction to bring the fine column-like crystals into conglutination.

The phosphor matrix layer may also comprise mixture of the above-described respective forms.

Among stimulable phosphors, thermostimulable phosphors have a slow response to excitation and have difficulty in the time series reading. For such reasons, useful are photostimulable phosphors in practical uses, and preferred are those which can exhibit stimulated emission at a stimulating excitation light of 500 nm or more.

Additional examples of phosphors may include, as disclosed in Japanese Unexamined Patent Publication No. 12143/1980, those represented by the following formula:

$$(Ba_{1-x-y}Mg_xCa_y)FX:eEu^{2+}$$

(wherein X is at least one of Br and Cl; each of x, y and e is a number satisfying the conditions of $0 < X + y \; 0.6$; $xy \neq 0$ and $10^{-6} < e < 5 \times 10^{-2}$); those as disclosed in Japanese Unexamined Patent Publication No. 12144/1980 which corresponds to U.S. Pat. No. 4,236,078:

$$LnOX:xA$$

(wherein Ln represents at least one of La, Y, Gd and Lu; X represents Cl and/or Br; A represents Ce and/or Tb; and x represents a number satisfying $0 < X < 0.1$); those as disclosed in Japanese Unexamined Patent Publication No. 12145/1980:

$$(Ba_{1-x}M^{II}x)FX:yA$$

(wherein $M^{II}$ represents at least one of Mg, Ca, Sr, Zn and Cd; X represents at least one of Cl, Br and I; A represents at least one of Eu, Tb, Ce, Tm, Dy, Pr, Ho, Nd, Yb and Er; x and y represent numbers satisfying the conditions of $0 \leq X \leq 0.6$ and $0 \leq y \leq 0.2$); those as disclosed in Japanese Unexamined Patent Publication No. 84389/1980:

$$BaFX:xCe,yA$$

(wherein X is at least one of Cl, Br and I; A is at least one of In, Tl, Gd, Sm and Zr; x and y are each $0 < X \leq 2 \times 10^{-1}$ and $0 < y \leq \times 10^{-2}$); those as disclosed in Japanese Unexamined Patent Publication No. 160078/1980:

$$M^{II}FX,xA:yLn$$

(wherein $M^{II}$ is at least one of Mg, Ca, Ba, Sr, Zn and Cd; A is at least one of BeO, MgO, CaO, SrO, BaO, ZnO, Al$_2$O$_3$, Y$_2$O$_3$, La$_2$O$_3$, In$_2$O$_3$, SiO$_2$, TiO$_2$, ZrO$_2$, GeO$_2$, SnO$_2$, Nb$_2$O$_5$, Ta$_2$O$_5$ and ThO$_2$; Ln is at least one of Eu, Tb, Ce, Tm, Dy, Pr, Ho, Nd, Yb, Er, Sm and Gd; X is at least one of Cl, Br and I; x and y are each number satisfying the conditions of $5 \times 10^{-5} \leq X \leq 0.5$ and $0 < y \leq 0.2$) (rare earth element activated divalent metal fluoride phosphors); those as disclosed in Japanese Unexamined Patent Publication No. 38278/1984:

$$xM_3(PO_4)_2 \cdot NX_2:yA$$

$$M_3(PO_4)_2:yA$$

(wherein each of M and N represents at least one of Mg, Ca, Sr, Ba, Zn and Cd; X represents at least one of F, Cl, Br and I; A represents at least one of Eu, Tb, Ce, Tm, Dy, Pr, Ho, Nd, Yb, Er, Sb, Tl, Mn and Sn; x and y are integers satisfying the conditions of $0 < X \leq 6$ and $0 \leq y \leq 1$);

$$nReX_3 \cdot mAX'_2:xEu$$

$$nReX_3 \cdot mAX'_2:xEu,ySm$$

(wherein Re represents at least one of La, Gd, Y and Lu; A represents at least one of alkaline earth metals of Ba, Sr and Ca; X and X' each represent at least one of F, Cl and Br; and x and y are integers satisfying the conditions of $1 \times 10^{-4} < X < 3 \times 10^{-1}$ and $1 \times 10^{-4} < y \; 1 \times 10^{-1}$; and n/m satisfies the condition of $1 \times 10^{-3} \; n/m < 7 \times 10^{-1}$) and $$M^IX \cdot aM^{II}X'_2 \cdot bM^{III}X''_3:cA$$

(wherein $M^I$ is at least one alkali metal selected from Li, Na, K, Rb and Cs; $M^{II}$ is at least one divalent metal selected from Be, Mg, Ca, Sr, Ba, Zn, Cd, Cu and Ni; $M^{III}$ is at least one trivalent metal selected from Sc, Y, La, Ce, Pr, Nd, Pm, Sm, Eu, Gd, Tb, Dy, Ho, Er, Tm, Yb, Lu, Al, Ga and In; X, X' and X" are each at least one halogen selected from F, Cl, Br and I; A is at least one metal selected from Eu, Tb, Ce, Tm, Dy, Pr, Ho, Nd, Yb, Er, Gd, Lu, Sm, Y, Tl, Na, Ag, Cu and Mg; a is a numeral within the range of $0 \leq a < 0.5$, b is a numeral within the range of $0 \leq b < 0.5$ and c is a numeral within the range of $0 < c \leq 0.2$) (alkali halide phosphors). Particularly, alkali halide phosphors are preferable, because stimulable phosphor layers can be formed easily according to the method such as vacuum vapor deposition, sputtering, etc.

However, the stimulable phosphor to be used in the radiation image storage panel of this invention is not limited to those as described above, but any phosphor which can exhibit stimulated fluorescence when irradiated with a stimulating excitation light after irradiation of radiation may be useful.

The radiation image storage panel of this invention may have a group of stimulable phosphor layers containing one or more stimulable phosphor layers comprising at least one of the stimulable phosphors as mentioned above. The stimulable phosphors to be contained in respective stimulable phosphor layers may be either identical or different.

The thickness of the stimulable phosphor layer in the panel of this invention, which may differ depending on the sensitivity of the panel to radiation, the kind of the stimulable phosphor, etc., may preferably be within the range of from 30 to 1,000 $\mu$m, more preferably from 60 to 600 $\mu$m.

The phosphor layer of the panel according to this invention have superior directivity of the stimulating excitation light and stimulated emission as previously mentioned, so that the scattering of stimulating excitation light in the phosphor layer decreases to remarkably improve the sharpness of images.

Used as supports in the panel according to this invention are all sorts of polymeric materials, glass, metals, ceramics, etc., and preferred are plastic films such as cellulose acetate films, polyester films, polyethylene terephthalate films, polyamide films, polyimide films, triacetate films and polycarbonate films, sheets of metals such as aluminum, iron, copper and chromium, or metal sheets having a layer of a coating comprising an oxide of any of these metals.

To improve the adhesion between the support and phosphor layer, these supports may also be provided with a subbing layer on the surface on which the phosphor layer is provided. The layer thickness of these supports may vary depending on the material quality or the like of the supports to be used, but may generally range from 80 $\mu$m to 2,000 $\mu$m, more preferably from 80 $\mu$m to 1,000 $\mu$m from the viewpoint of handling.

In the panel according to this invention, in general, a protective layer to physically or chemically protect the phosphor layer may also be provided on the surface on which the above phosphor layer exposes. This protective layer may be formed by directly coating a protective layer coating solution on the phosphor layer, or may be provided by adhering on the phosphor layer a protective layer previously separately formed. Used as materials for the protective layer are commonly used protective layer materials such as cellulose acetate, nitrocellulose, polymethyl methacrylate, polyvinyl butyral, polyvinyl formal, polycarbonates, polyesters, polyethylene terephthalate, polyethylene, polyvinylidene chloride, and nylons.

This protective layer may also be formed by laminating an inorganic material such as SiC, $SiO_2$, SiN and $Al_2O_3$ by vapor deposition, sputtering or the like methods. The thickness of these protective layers may generally preferably range from 0.1 $\mu$m to 100 $\mu$m in approximation.

Figure 6:
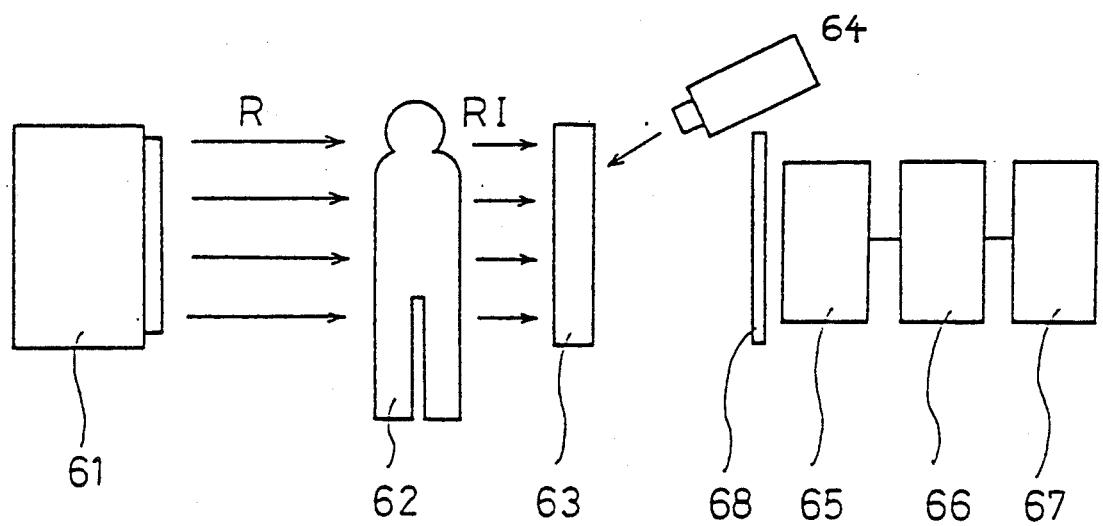
FIG. 6 is a view explanatory of the radiation image storage method employing the panel according to this invention.

The panel according to this invention can provide superior sharpness, graininess and sensitivity, when it is used in the radiation image storage method as schematically illustrated in FIG. 6. More specifically, in FIG. 6 the numeral 61 denotes a radiation generator; 62, a subject; 63, a panel according to this invention; 64, a stimulating excitation light source; 65, a photoelectric transducer to detect stimulated emission radiated from the panel; 66, a unit to reproduce as an image the signals detected by 65; 67, a unit to display a reproduced image; and 68, a filter to separate the stimulating excitation light and stimulated emission and passes only the stimulated emission.

The units posterior to the unit 65 may be any of those which can reproduce light information as an image in any form, and by no means limited to the above-described. As shown in FIG. 6, the radiation from the radiation generator 61 is made incident on the panel of this invention through the subject 62. This radiation thus made incident is absorbed in the phosphor layer of the panel 63, where its energy is accumulated and an accumulated image of the radiation-transmitted image is formed.

Next, this accumulated image is excited by the stimulating excitation light from the stimulating excitation light source 64 and emitted as stimulated emission.

The panel 63 contains no binder in its phosphor layer and has a high directivity of the stimulating excitation light of the phosphor layer, so that the scattering of the stimulating excitation light can be suppressed in the phosphor layer when scanned by the above stimulating excitation light.

The strength of the stimulated emission thus radiated is proportional to the amount of accumulated radiation energy. Accordingly, this light signal may be subjected to photoelectrical conversion by means of the photoelectric transducer 65 as exemplified by a photomultiplier tube, reproduced as an image by the image-reproducing unit 66, and may be displayed by the image display unit 67, so that the radiation-transmitted image of the subject can be viewed.

EXAMPLES

This invention will be described below by giving Examples.

EXAMPLE 1

As a support, quartz glass of 1,000 $\mu$m thick was placed in the vapor deposition apparatus illustrated in FIG. 3. Next, put in a molybdenum boat for use in resistance heating was RbBr, a matrix raw material of the intended alkali halide stimulable phosphor (RbBr:0.0003Tl), and put in the other tantalum boat was an activator TlBr, which were set to the resistance heating electrodes, followed by evacuation of the vapor deposition apparatus to give a vacuum degree of $2 \times 10^{-6}$ Torr. Next, the tantalum boat was electrified to evaporate TlBr by of the intended activator concentration, TlBr was built up on the above support until the layer thickness comes to be 0.2 $\mu$m thick while controlling its vapor deposition rate.

Subsequently, the molybdenum boat was electrified to evaporate RbBr, and RbBr was built up on the above TlBr layer until the layer thickness comes to be 300 $\mu$m thick. Next, a panel thus obtained and as illustrated in FIG. 2(a) was set in the electric furnace as illustrated in FIG. 7, and treated by heating for 0.5 hour at 600° C. to obtain Panel A according to this invention.

Panel A thus obtained and according to this invention was exposed to 10 mR of X-rays having a tube voltage of 80 K Vp, and thereafter subjected to stimulating excitation using a semiconductor laser beam (780 nm).

where the stimulated emission radiated from the phosphor layer was subjected to photoelectric conversion with use of a photodetector (a photomultiplier tube), and the resulting signals were reproduced as an image by use of an image-reproducing unit, which was then recorded on a silver salt film. The sensitivity of Panel A to X-rays was examined from the size of the signals to obtain the results as shown in Table 1. in Table 1, the sensitivity to X-rays is indicated as a relative value assuming that of Panel A of this invention as 100.

EXAMPLE 2

Example 1 was repeated except that the heat treatment was carried out for 2 hours at a temperature of 300° C., to obtain Panel B according to this invention. Panel B thus obtained was evaluated in the same manner as in Example 1 to obtain the results as shown in Table 1.

EXAMPLE 3

As a support, quartz glass of 1,000 μm thick was placed in the vapor deposition apparatus illustrated in FIG. 3. Put in a molybdenum boat for use ian resistance heating was RbBr, a matrix raw material of the intended alkali halide stimulable phosphor (RbBr:0.0003Tl), which were set to the resistance heating electrodes, followed by evacuation of the vapor deposition apparatus to give a vacuum degree of $2 \times 10^{-6}$ Torr. Next, the molybdenum boat was electrified to evaporate RbBr, which was built up on the above support until the layer thickness comes to be 300 μm thick, thus obtaining a RbBr phosphor layer (Panel S).

Next this Panel S was set in a heat-treating vessel of the diffusion method apparatus as illustrated in FIG. 4(a), and treated by heating for 1 hour at 600° C. while blowing TlBr vapor thereinto so a to give a TlBr concentration of 0.0003 mol per mol of RbBr, to obtain Panel C according to this invention. Panel C thus obtained was evaluated in the same manner as in Example 1 to obtain the results as shown in Table 1.

EXAMPLE 4

Panel S obtained in the same manner as in Example 3 was put in a heat-treating vessel of the apparatus as illustrated in FIG. 4(b), and packed around it was an atmospheric powder (RbBr+0.0003TlBr) having the same composition as the composition of the intended phosphor layer. Next, this vessel was treated by heating for 1 hour at 600° C. to obtain Panel D according to this invention. Panel D thus obtained was evaluated in the same manner as in Example 1 to obtain the results as shown in Table 1.

COMPARATIVE EXAMPLE 1

As a support, quartz glass of 1,000 μm thick was placed As in the vapor deposition apparatus illustrated in FIG. 3. Next, put in a molybdenum boat for use in resistance heating was a mixed powder (RbBr+0.0003TlBr) having the same composition as the composition of the intended alkali halide stimulable phosphor (RbBr:0.0003Tl), which was set to a resistance heating electrode, followed by evacuation of the vapor deposition apparatus to give a vacuum degree of $2 \times 10^{-6}$ Torr. Next, the tantalum boat was electrified to evaporate the RbBr-TlBr mixed powder by resistance heating, which was built up on the above support until the layer thickness comes to be 300 μm thick to obtain a comparative Panel P.

COMPARATIVE EXAMPLE 2

As a support, quartz glass of 1,000 μm thick was placed in the vapor deposition apparatus illustrated in FIG. 3. Next, put in a molybdenum boat for use in resistance heating was RbBr, a raw material of the intended alkali halide stimulable phosphor (RbBr:0.0003Tl), and put in the other tantalum boat was TlBr, which were set to the resistance heating electrodes, followed by evacuation of the vapor deposition apparatus to give a vacuum degree of $2 \times 10^{-6}$ Torr. Next, the respective molybdenum and tantalum boats were electrified to evaporate RbBr and TlBr by resistance heating To obtain a phosphor layer comprised of the intended activator concentration, RbBr and TlBr were built up on the above support until the layer thickness comes to be 300 μm thick while controlling the vapor deposition rate of RbBr to 180 angstroms/S and the vapor deposition rate of TlBr to 1.2 angstroms/S by detecting the vapor deposition rates of RbBr and TlBr by use of a film thickness detector for each and making feedback to their respective vapor deposition controllers, thus obtaining a comparative Panel Q.

Comparative Panels P and Q thus obtained were evaluated in the same manner as in Example 1 to obtain the results as shown in Table 1.

TABLE 1

| Panel | X-ray sensitivity | Graininess & sharpness |
|---|---|---|
| Panel A of this invention | 100 | Good |
| Panel B of this invention | 82 | Good |
| Panel C of this invention | 131 | Good |
| Panel D of this invention | 135 | Good |
| Comparative Panel P | 12 | Good |
| Comparative Panel Q | 42 | Good |

As will be clear from Table 1, Panels A to D according to this invention, though having equal graininess and sharpness as compared with the comparative Panel P, showed the sensitivity to X-rays as high as 7 to 11 times.

This is presumed to be because, in the comparative Panel P, which has an extremely high vapor pressure of TlBr as compared with RbBr, TlBr is evaporated in preference to RbBr at the time of the vapor deposition, resulting in lowering of the TlBr concentration in RbBr.

The comparative Panel Q also showed the sensitivity to X-rays of ⅓ to ½ as compared with that of the panels of this invention.

This is presumed to be because, in the panels according to this invention, the heat-sensitizing treatment can be applied simultaneously at the time of the diffusion addition of TlBr and thus the sensitivity increased owing to the heat-sensitizing effect.

EXAMPLE 5

As a support, quartz glass of 1,000 μm thick was placed in a vapor deposition vessel. Next, put in a molybdenum boat for use in resistance heating was RbBr, a raw material of the intended alkali halide stimulable phosphor (RbBr:0.0003Tl), and put in the other tantalum boat was TlBr, which were set to the resistance heating electrodes, followed by evacuation of the vapor deposition vessel to give a vacuum degree of $2 \times 10^{-6}$ Torr. Next, the respective molybdenum and tantalum boats were electrified to evaporate RbBr and TlBr by resistance heating A RbBr:0.0003Tl stimulable phosphor was built up on the above support until the layer thickness comes to be 300 μm thick while controlling the vapor deposition for each, thus obtaining Panel S.

Next, this Panel S was set in a heat-treating vessel of illustrated in FIG. 4(a), and treated by heating for 1 hour at 600° C. while blowing TlBr vapor thereinto so as to give a TlBr concentration of 0.0003 mol per 1 mol of RbBr. In this manner, Panel E according to the process of this invention was obtained.

Panel E according to this invention thus obtained was exposed to 10 mR of X-rays having a tube voltage of 80 K Vp, and thereafter subjected to stimulating excitation using a semiconductor laser beam (790 nm), where the stimulated emission radiated from the stimulable phosphor layer was subjected to photoelectric conversion with use of a photodetector (a photomultiplier tube), and the resulting signals were reproduced as an image by use of an image-reproducing unit, which was then recorded on a silver salt film. The sensitivity of Panel A to X-rays was examined from the size of the signals to obtain the results as shown in Table 2.

In Table 2, the sensitivity to X-rays is indicated as a relative value assuming that of Panel A of this invention as 100.

EXAMPLE 6

Panel S obtained in Example 5 was put in a heat-treating vessel of the apparatus illustrated in FIG. 4(b), and packed around it was a mixed powder (RbBr+0.0003TlBr) having the same composition as the composition of the intended phosphor layer. Next, this vessel was treated by heating for 1 hour at 600° C. to obtain Panel F according to the process of this invention. Panel F thus obtained was evaluated in the same manner as in Example 1 to obtain the results as shown in Table 1.

EXAMPLE 7

Example 6 was repeated except that the heat treatment was carried out for 3 hours at a temperature of 300° C., to obtain Panel G according to this invention. Panel G thus obtained was evaluated in the same manner as in Example 5 to obtain the results as shown in Table 2.

COMPARATIVE EXAMPLE 3

Panel S obtained in Example 5 was placed in a heat-treating vessel of the apparatus illustrated in FIG. 7, and this was treated by heating for 1 hour at 600° C. to obtain a comparative Panel R. The comparative panel R thus obtained was evaluated in the same manner as in Example 5 to obtain the results as shown in Table 2.

COMPARATIVE EXAMPLE 4

Example 5 was repeated except that the heat treatment was carried out for 3 hours at a temperature of 300° C., to obtain a comparative Panel Z. Panel Z thus obtained was evaluated in the same manner as in Example 5 to obtain the results as shown in Table 2.

TABLE 2

| Panel | X-ray sensitivity | Graininess & sensitivity |
| --- | --- | --- |
| Panel E of this invention | 100 | good |
| Panel F of this invention | 98 | good |
| Panel G of this invention | 81 | good |
| Comparative Panel R | 43 | good |
| Comparative Panel Z | 36 | good |
| Non-heat-treated Panel S | 35 | good |

As will be clear from Table 2, Panels E, F and G according to the process of this invention, though having equal graininess and sharpness as compared with the comparative Panels R and Z, showed the sensitivity to X-rays as high as about 2 to 3 times. This is attributable to the fact that the escaping of the activator from the phosphor layer was suppressed in the heat treatment, effectively making the most of the heat-sensitizing effect. On the other hand, the comparative Panels R and Z caused the escaping of the activator in the heat treatment, therefore having resulted in an extreme lowering of the sensitivity to X-rays.

The sensitizing effect by the heat treatment is clearly seen when compared with Panel S having been not subjected to the heat treatment.

As described above, it is possible according to this invention to carry out the heat treatment while securing the activator concentration in the phosphor layer. For this reason, it has become possible to remarkably improve the sensitivity to radiations without causing any lowering of the graininess and sharpness by virtue of the heat-sensitizing effect of the stimulable phosphor.

As also having described in the above, it is possible according to this invention to remarkably increase the sensitivity to radiations by forming only the phosphor matrix layer and thereafter adding thereto the activator particularly utilizing the thermal diffusion. Moreover, since the phosphor matrix layer is formed by the vapor phase build-up method, there is seen no lowering of the graininess and sharpness that may otherwise be accompanied when the sensitivity is made higher. Since also the activator is added by thermal diffusion, the activator concentration can be made uniform in the panel having a large area, so that images of high image quality can be obtained.

Also, the addition by thermal diffusion makes it possible to carry out the addition of the activator and the heat-sensitizing treatment simultaneously, thus resulting also in great improvement in the productivity.

Accordingly, this invention is very great in its effect, and industrially useful.

We claim:

1. A process for preparing a radiation image storage panel comprising a support and a phosphor layer containing an activated stimulable phosphor formed on said support, comprising:

forming said phosphor layer on said support with a thickness of 60 to 600 μm from a stimulable phosphor matrix and an activator, by a vapor phase built-up method; and thereafter applying a heat-treatment to said phosphor layer, said heat treatment comprising heating the phosphor layer to a temperature in the range of ⅓ the melting point temperature Tm of said stimulable phosphor matrix to the melting point temperature Tm, and being conducted in a gas containing the activator provided that the vapor pressure of the activator is greater than the vapor pressure of the stimulable phosphor matrix.

2. The process for preparing a radiation image storage panel of claim 1, wherein said heat-treatment is conducted in the presence of a powder containing said activator.

3. The process for preparing a radiation image storage panel of claim 1, wherein the phosphor layer comprises an alkali halide phosphor.

4. The process for preparing a radiation image storage panel of claim 1, wherein the heat-treatment is conducted in the range of 200 to 600° C.

5. A process for preparing a radiation image storage panel comprising a support and a phosphor layer containing an activated stimulable phosphor, comprising:

forming said phosphor layer on said support with a thickness of 60 to 600 μm by forming a stimulable phosphor matrix layer from a stimulable phosphor matrix and an activator layer from an activator, said stimulable phosphor matrix layer and said activator layer being in contact with each other and on said support, using a vapor phase built-up method, and thereafter applying a heat-treatment to said stimulable phosphor matrix layer and said activator layer to form said stimulable phosphor layer, said heat treatment comprising heating said layers to a temperature in the range of ¼ the melting point temperature Tm of said stimulable phosphor matrix to the melting point temperature Tm, provided that the vapor pressure of the activator is greater than the vapor pressure of the stimulable phosphor matrix.

6. A process for preparing a radiation image storage panel comprising a support and a phosphor layer containing an activated stimulable phosphor on said support, comprising:

forming a layer containing a stimulable phosphor matrix to a thickness of 60–600 μm on said support, by a vapor phase built-up method; and thereafter applying a heat-treatment to said layer containing the stimulable phosphor matrix, by heating said layer to a temperature in the range of ¼ the melting point temperature Tm of said stimulable phosphor matrix to the melting point temperature Tm in a gas containing an activator for the activated stimulable phosphor, provided that the vapor pressure of the activator is greater than the vapor pressure of the stimulable phosphor matrix.

7. The process for preparing a radiation image storage panel of claim 6, wherein the heat-treatment is conducted in the presence of a powder containing said activator.

8. The process for preparing a radiation image storage panel of claim 6, wherein said phosphor layer comprises an alkali halide phosphor.

9. The process for preparing a radiation image storage panel of claim 6, wherein the heat-treatment is conducted in the range of 200 to 600° C.

* * * * *